United States Patent [19]
Bower

[11] 3,858,912
[45] Jan. 7, 1975

[54] CONDUIT JOINT ASSEMBLY

[76] Inventor: Ray B. Bower, R.D. 8, Greensburg, Pa. 15601

[22] Filed: May 16, 1973

[21] Appl. No.: 360,817

[52] U.S. Cl.............. 285/230, 285/291, 285/374, 285/336, 285/DIG. 11, 277/DIG. 2, 264/310
[51] Int. Cl............................................ F16l 49/00
[58] Field of Search .......... 285/230, 288, 291, 345, 285/231, 374, 336, DIG. 11; 277/DIG. 2; 264/310

[56] References Cited
UNITED STATES PATENTS

| | | | |
|---|---|---|---|
| 2,639,731 | 5/1953 | Whiting | 285/288 |
| 2,982,569 | 5/1961 | Miller et al. | 285/230 |
| 3,503,636 | 3/1970 | Bower | 285/374 X |
| 3,767,232 | 10/1973 | Smith | 285/230 X |

Primary Examiner—Richard J. Scanlan, Jr.
Attorney, Agent, or Firm—Burns, Doane, Swecker & Mathis

[57] ABSTRACT

A pipe joint assembly comprises a ring-like insert disposed on the spigot of one pipe section and a ring-like insert disposed in the socket of an adjacent pipe section. The inserts include ribs for inhibiting the accumulation of material within grooved portions of the inserts during fabrication of the pipe sections, and for resisting the leakage of fluid between the inserts and the pipe section. A gasket is disposed within the grooved portions of the inserts to couple and seal the pipe sections. The gasket is uniquely configured to provide maximum sealing, and includes shoulder portions which enhance sealing, as well as maintain the gasket in position during interengagement of the pipe sections.

10 Claims, 3 Drawing Figures

PATENTED JAN 7 1975

3,858,912

CONDUIT JOINT ASSEMBLY

BACKGROUND OF THE INVENTION

The invention relates to a conduit joint assembly and more particularly to a conduit joint assembly which provides a sealed connection between adjoining ends of non-metallic pipe sections.

Multi-section, non-metallic pipelines are widely used in many fluid carrying applications, such as sanitary sewer lines for example. To install non-metallic pipeline, such as concrete pipeline, separate sections of concrete pipes are laid end-to-end, with the adjoining ends thereof being interconnected by a pipe joint assembly.

One commercially successful form of pipe joint assembly is described in U.S. Bower U.S. Pat. No. 3,503,636, issued to the present inventor on Mar. 31, 1970, the disclosure of which being incorporated herein by reference. The pipe sections described therein include spigot and bell, i.e., tongue and socket, ends. These ends are arranged such that the spigot of one pipe section is receivable in the bell socket of an adjoining pipe section. The outer surface of the spigot and the inner surface of the socket are provided with rigid insert rings having circular grooves therein. These grooves are arranged to be in registry when the spigot is inserted within the socket, to define an annular chamber. The chamber is configured to receive a resilient gasket, such as an O-ring seal. Assemblage of the pipe sections is accomplished by inserting the O-ring within the spigot groove and sliding the spigot and socket together until the exposed portion of the O-ring locks into place within the socket groove. While the previously-described pipe joint assembly provides a simplified and yet highly effective pipe connection and seal, it would be advantageous to further enhance the sealing and securing effectiveness thereof.

In this connection, it is noted that during the fabrication of these types of pipe sections, the inserts are installed into concrete pipe forms, and the forms are rotated while concrete slurry flows into the interior of the form. When the concrete hardens, the inserts are firmly imbeded within the concrete. During this operation, there may be a tendency for concrete to accumulate within the grooves of the inserts. If the grooves are not subsequently scoured or polished to remove these deposits, the ability of the gasket to seal effectively may be impaired.

Moreover, there may be a tendency in conduit joint assemblies having gasket-receiving inserts imbeded within concrete pipes, for fluid to leak through the joint between the insert and the concrete.

OBJECTS AND SUMMARY OF A PREFERRED FORM OF THE INVENTION

It is therefore, a general object of the invention to provide a novel conduit joint apparatus and method which obviates or minimizes problems of the sort previously noted.

It is a further object of the present invention to provide such a novel apparatus and method which tend to prevent the accumulation of deposits within insert grooves during the fabrication of non-metallic pipes.

It is a particular object of the invention to provide a novel pipe joint assembly which effectively couples adjoining pipe ends and is particularly resistent to fluid leakage.

It is yet another object of the present invention to provide a novel method for imbedding inserts within non-metallic pipes.

A preferred form of the invention intended to accomplish at least some of the foregoing objects entails the provision of a pipe joint assembly for use with non-metallic pipe sections having spigot and bell-socket ends. An insert is disposed around the outer surface of the spigot, and an insert is disposed around the inner surface of the socket. Each insert includes a groove extending around the circumference thereof for receiving a portion of a coupling gasket.

The inner end of the socket insert terminates in an annular flange which projects generally radially inwardly and is contiguous with a shoulder portion of the pipe defining the inner terminus of the socket. The outer end of the socket insert terminates in an annular flange which projects into the socket-defining portion of the associated pipe section. This outer flange includes a generally radially extending annular portion and a generally axially extending lip portion which projects generally toward the socket groove.

The outer end of the spigot insert terminates in an annular flange which extends generally radially inwardly and is contiguous with an end face of the spigot. The inner end of the spigot insert terminates in an annular flange which extends generally inwardly into the spigot.

The flanges which are disposed at the inner and outer ends of the socket and spigot, respectively, function to inhibit the accumulation, within the socket and spigot grooves, of material, such as concrete and the like, during fabrication of the pipe sections. Moreover, the insert flanges function to resist the leakage of water through the conduit joint assembly between the inserts and the pipe sections, as well as to firmly anchor the inserts within the pipe sections.

In a preferred method in accordance with the invention, the inserts are installed within pipe forms. Concrete slurry is poured into the forms, as the forms rotate, thereby causing the slurry to flow around the inserts. Subsequently the concrete is cured with the inserts imbeded firmly therein. The inner flange of the socket insert and the outer flange of the spigot insert function to resist the accumulation of concrete within the insert grooves.

In a further significant aspect of a preferred embodiment, a coupling gasket is provided which includes a base section and a bulbous head section. The gasket is arranged to be installed on the spigot insert such that the base section is disposed within the spigot groove. The head section includes shoulder portions which engage the outer surface of the spigot insert at opposite sides of the spigot groove. The head section of the gasket is configured in general conformity with the socket groove such that when the socket and spigot are brought axially together, the head section may expand outwardly into coupling and sealing relationship with the socket groove. During this operation, a shoulder portion of the head section serves to firmly retain the gasket within the spigot groove. The insert grooves and the gasket are mutually configured in a manner which provides maximum sealing and coupling relationship therebetween.

THE DRAWINGS

This preferred embodiment of the invention is described in the subsequent detailed description and is illustrated in the accompanying drawings in which like numerals designate like elements, and in which.

DETAILED DESCRIPTION OF THE PREFERRED EMBODIMENT

Figure 1:
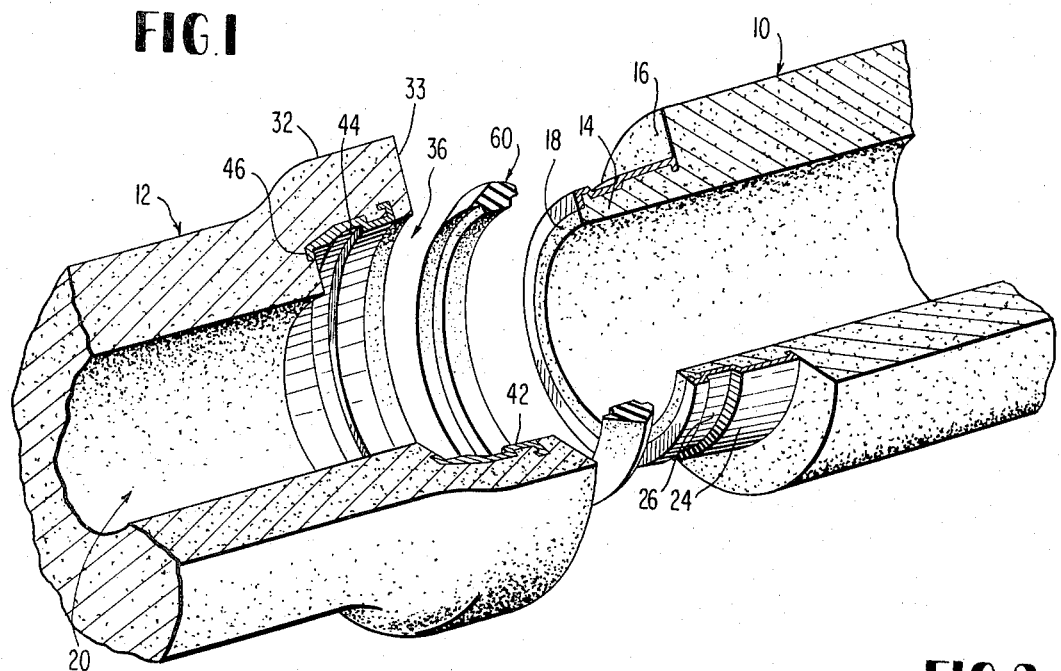
FIG. 1 is an exploded, perspective view, in longitudinal section, of a conduit joint assembly according to the present invention.

A pipe joint assembly for use in conjunction with a pair of adjoining pipe sections 10 and 12, is depicted in FIG. 1. The pipe sections 10 and 12 are preferably constructed of a non-metallic material, such as concrete for example. A male, or spigot, coupling end of the pipe section and the female, or bell, end of the pipe section 12 are shown in FIG. 1.

The spigot end of the pipe section 10 includes a spigot, or tongue, 14 which is preferably configured as a frusto-conical projection that extends axially outwardly from an annular shoulder 16 of the pipe section 10. The spigot 14 terminates at its outer end in a radially disposed end face 18 which surrounds the central fluid conducting passage 20 of the pipe section 10. Mounted on the outer surface of the spigot 14 is an insert ring 24 which is of corresponding frusto-conical configuration. This spigot insert 24 may be formed of a variety of suitable materials, such as metal and plastic for example, and includes an outwardly opening circumferential groove 26 formed in the outer surface thereof.

The spigot insert 24 terminates at its ends in generally inwardly projecting ribs. The outermost rib is preferably in the form of an annular protector flange 28. This flange 28 is circumferentially continuous, i.e., it extends around the entire periphery of the spigot insert 24. The protector flange 28 is generally contiguous with the end face 18 of the spigot 14.

The innermost rib of the spigot insert 24 is preferably in the form of a circumferentially continuous, radially inwardly projecting annular flange 30 which projects into the pipe section 10 and is generally contiguous with the shoulder 16 of this pipe section.

It will be apparent that the annular flanges 28 and 30 and the groove-defining portion of the insert 24 serve to firmly anchor the insert within the pipe section 10.

The bell end of the pipe section 12 includes a socket-defining portion 32 which terminates in an end face 33. The socket 36 defined thereby includes an inner surface 34 which is tapered inwardly generally complimentary to the taper of the spigot 14. The socket 36 terminates in an annular shoulder 38 which surrounds the central fluid-conduction passage 20 of the pipe section 12. A corner 40 is formed by the intersection of the inner surface 34 and the end face 33 of the pipe section 12.

Figure 2:
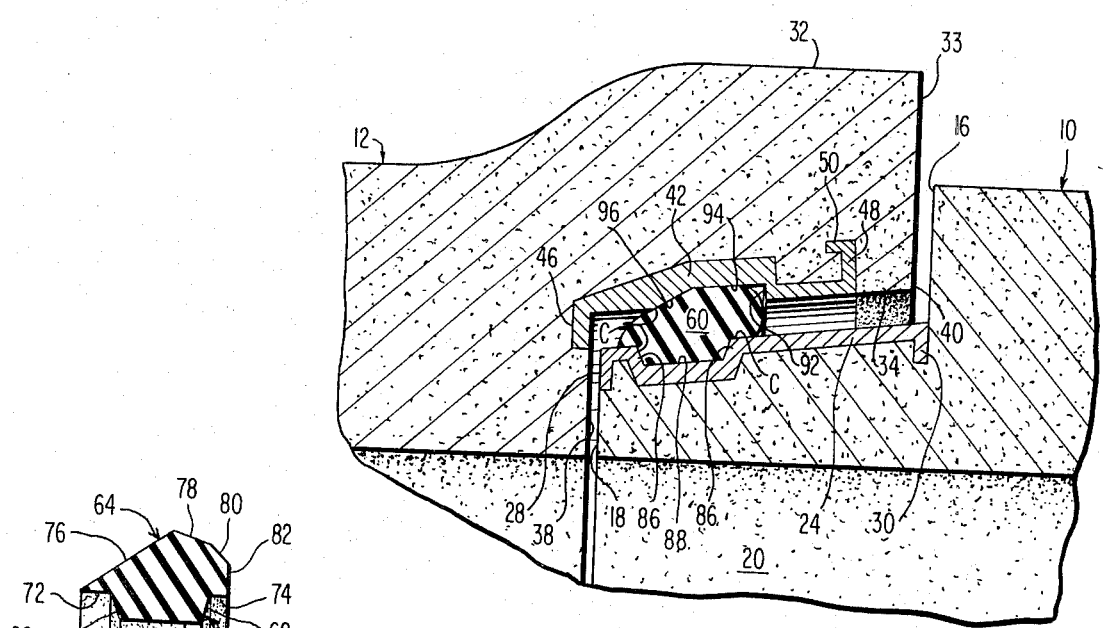
FIG. 2 is a longitudinal sectional view of a portion of the conduit joint in its assembled condition.

Affixed to the inner surface 34 of the socket is an insert 42. This insert 42, which may be formed of one of the same variety of materials as the spigot insert 24, includes an inwardly opening circumferential groove 44 formed in the outer surface thereof. At its inner end the socket insert 42 includes a rib. This rib is preferably in the form of an annular, radially inwardly projecting protector flange. This protector flange 46 is circumferentially continuous and is contiguous with the shoulder 38. As is depicted in FIG. 2, the protector flange 46 is disposed radially inwardly of the socket groove 44.

The outer end of the socket insert 42 terminates in a rib which is preferably in the form of a circumferentially continuous outwardly projecting flange 48. This flange 48 projects into the socket defining portion 32 of the pipe section 12 and includes a lip portion 50 which projects in a direction generally toward the socket groove 44. As will be apparent, the protector flange 46, the groove-defining portion of the socket insert, and the flange 48 serve to firmly anchor the insert 42 within the bell end of the pipe section 12.

The insert rings 24 and 42 are affixed to the spigot 14 and the socket-defining portion 32 of the associated pipe sections during fabrication thereof. This is effected by installing the inserts into pipe forms, and then pouring a material, such as a concrete slurry for example, into the forms around the inserts as the forms rotate. After the concrete cures, the inserts are permanently and firmly imbeded within the pipe sections without increasing the normal size thereof.

Significantly, the protector flanges 28 and 46 of the spigot and socket inserts 24, and 42, respectively, form barriers between the concrete and the insert grooves 26 and 44 to inhibit the accumulation of concrete within these grooves as might otherwise occur during the fabrication process. As a result, it is unnecessary to subsequently scour or polish the grooves in order to produce a surface which is sufficiently smooth to effect a desired sealing engagement with a gasket.

Moreover, the overall ribbed and grooved configuration of the spigot and bell inserts, enables these inserts to effectively inhibit the travel of fluid between the inserts and the concrete.

It is conventional to employ a resilient gasket in order to couple together the adjoining pipe ends and to provide a fluid-tight seal therebetween. It will be appreciated that any suitable form of gasket may be employed to couple together the afore-described pipe sections 10 and 12.

According to the present invention, a coupling gasket 60 is provided which exhibits superior coupling and sealing features and, thus, is desirably employed in conjunction with the novel inserts 24 and 42, or with other forms of inserts.

Figure 3:
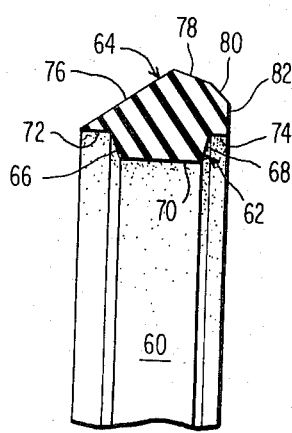
FIG. 3 is a transverse sectional view through a portion of a gasket in accordance with the present invention.

As shown in FIG. 3, the gasket 60 is of annular configuration and includes a base section 62 and a head section 64. The base section comprises a pair of inwardly tapering side faces 66 and 68 and an inner rim face 70.

The head section 64 is integral with the base section 62 and is of generally bulbous configuration relative thereto. This bulbous head 64 includes a pair of shoulders defined by a pair of shoulder surfaces 72 and 74. These shoulder surfaces extend generally axially outwardly from the side faces 66 and 68 of the base section 62.

The outer periphery of the head section is defined by a pair of generally converging side portions. A first of the side portions comprises a wall 76 which has a generally constant slope from the shoulder surface 72 to the second side portion. The second side portion, in the disclosed embodiment, comprises a series of three contiguous, angularly-related walls 78, 80, and 82 which extends between the shoulder surface 74 and the sloping wall 76. It will be appreciated, however, that the configuration of the head section, as well as the base section, may take various forms in accordance with the teachings of the present invention.

The spigot and socket grooves 26 and 44 are appropriately configured to receive the base and head sections 62 and 64 of the gasket 60. Thus, the spigot groove 26 includes a pair of inwardly converging side walls 84 and 86 and a rim wall 88. The socket groove 44 includes a generally radial side wall 92, a rim wall 94, and a sloping side wall 96, the latter corresponding substantially to the slope of the side wall 76 of the gasket head section 64.

To assemble the pipe sections 10 and 12, the coupling gasket 60 is initially inserted onto the spigot 14 with the base section 62 seated within the spigot groove 26. In such a position, the shoulder surfaces 72 and 74 engage the outer surface of the spigot insert on opposite sides of the spigot groove 26.

The spigot end of the pipe section 10 and the bell end of the adjoining pipe section 12 are then brought together axially. The side wall 76 of the gasket 60 is engaged and compressed by the corner 40 of the socket-defining portion 32. The socket insert 42 slides over the compressed gasket 60 until the socket groove 44 registers with the head section 64 of the gasket. At this point, the head section 64 snaps outwardly into coupling and sealing engagement with the socket groove 44.

During this assemblage operation, the gasket 60 is held firmly within the spigot groove 26. The tendency of the socket-defining portion 32 to "roll" the gasket from the spigot groove 26 is effectively resisted by engagement between the shoulder surface 74 of the gasket and the outer surface of the spigot insert 24. This resistance is further enhanced by engagement between the faces of the base section 62 and the walls of the spigot groove 26.

With the pipe sections 10 and 12 coupled together as shown in FIG. 2, a fluid seal will be provided between the gasket 60 and the insert grooves 26 and 44. In this connection, it will be realized that there exists substantial surface contact between the gasket and the insert grooves. Moreover, the inserts 24 and 42 define a series of corners c which enhance the sealing effects when pressed against the gasket.

It will also be understood that in the assembled condition of the pipe sections 10 and 12, a portion of the shoulder defined by the shoulder surface 72 and the sloping wall 76 will project from the gasket-receiving channel defined by the spigot and socket grooves 26 and 44. Consequently, when the sloping surface 76 is contacted by high pressure fluids being conducted by the pipeline, this projecting shoulder portion will be urged into the gasket-receiving channel, thereby expanding the gasket outwardly into yet tighter engagement with the insert grooves 24 and 42.

The present invention has been disclosed in conjunction with pipe sections having spigots and bell sockets of annular cross-section. It will be realized, however, that the novel inserts and gaskets of the present invention may be utilized with spigots and bell sockets of any suitable configuration, such as those of eliptical cross-section, for example.

Although the invention has been described in conjunction with a preferred embodiment thereof, it will be appreciated by those skilled in the art, that additions, modifications, substitutions, and deletions not specifically described may be amended without departing from the spirit and scope of the invention as defined in the appended claims.

What is claimed is:

1. In a joint assembly of a pair of non-metallic pipe sections arranged in end-to-end relation; one of said pipe sections having a spigot and the other of said pipe sections having socket-defining means; said spigot being disposed in said socket; said spigot having an outer surface terminating in an end face; said socket having an inner surface terminating in a shoulder; a ring-like insert disposed around the outer surface of said spigot, said spigot insert having inner and outer ends and an outwardly opening circumferential groove; a ring-like insert being disposed around the inner surface of said socket, said socket insert having inner and outer ends and an inwardly opening circumferential groove; and a flexible coupling gasket disposed partly in each of said insert grooves in coupling and sealing relationship with said inserts; the improvement wherein:

said socket insert further comprises:
a first circumferentially continuous rib means extending along at least a portion of said socket shoulder radially inwardly of said socket groove;
a second circumferentially continuous rib means extending into said socket-defining means, with said socket groove being disposed intermediate said first and second rib means; and said spigot insert further comprising:
a third circumferentially continuous rib means extending along at least a portion of said spigot end face; and
a fourth circumferentially continuous rib means extending into said spigot with spigot groove being disposed intermediate said third and fourth rib means.

2. The apparatus according to claim 1 wherein said first and second rib means comprise the inner and outer ends of said socket insert; and said third and fourth rib means comprise the inner and outer ends of said spigot insert.

3. The apparatus of claim 2 wherein said second rib means comprises a flange extending into said socket-defining means intermediate the ends of said socket; said flange having a generally radially extending portion which terminates in a generally axially extending lip portion projecting generally toward said socket groove; and said spigot insert overlying the entire outer surface of said spigot.

4. The apparatus according to claim 1 wherein said gasket comprises a base section mounted in said spigot groove and a generally bulbous head section, integral with said base section, being mounted in said socket groove; said head section including a pair of shoulders engaging the outer surface of said spigot insert on opposite sides of said spigot groove.

5. In a joint assembly of a pair of non-metallic pipe sections arranged in end-to-end relation; one of said pipe sections having a spigot and the other of said pipe sections having socket-defining means; said spigot being disposed in said socket; said spigot having an outer surface terminating in an end face; said socket having an inner surface terminating in a shoulder; a ring-like insert disposed around the outer surface of said spigot, said spigot insert having inner and outer ends and an outwardly opening circumferential groove;

a ring-like insert being disposed around the inner surface of said socket, said socket insert having inner and outer ends and an inwardly opening circumferential groove; and a flexible coupling gasket disposed partly in each of said insert grooves in coupling and sealing relationship with said inserts; the improvement wherein said gasket comprises:

a base section mounted in said spigot groove, and a generally bulbous head section, integral with said base section, being mounted in said socket groove; said head section including a pair of shoulders engaging the outer surface of said spigot insert on opposite sides of said spigot groove.

6. The assembly according to claim 5 wherein said spigot groove includes a pair of inwardly converging side wallls and a rim wall; said base section of said gasket including a pair of inwardly converging side faces and a rim face arranged generally complimentary to the walls of said spigot groove.

7. The assembly acccording to claim 5 wherein the outer periphery of said gasket head section includes a pair of side surfaces which converge outwardly from respective ones of said shoulders; a first of said side surfaces having a constant slope, with said socket groove including a socket wall having a slope generally complimentary to the slope of said first side surface.

8. The apparatus according to claim 5 wherein one of said shoulders projects axially beyond a gasket-receiving channel defined by said insert grooves; said last-named shoulder communicating with fluid being conducted by said pipe sections for being urged into said gasket-receiving channel in response to the imposition of fluid pressure against said sloping surface.

9. The apparatus according to claim 8 wherein said insert grooves define a plurality of corners which press against the outer periphery of said gasket.

10. In a joint assembly of a pair of non-metallic pipe sections arranged in end-to-end relation; one of said pipe sections having a spigot and the other of said pipe sections having socket-defining means; said spigot being disposed in said socket; said spigot having an outer surface terminating in an end face; said socket having an inner surface terminating in a shoulder; a ring-like insert disposed around the outer surface of said spigot, said spigot insert having inner and outer ends and an outwardly opening circumferential groove; a ring-like insert disposed around the inner surface of said socket, said socket insert having inner and outer ends and an inwardly opening circumferential groove; and a flexible coupling gasket disposed partly in each of said insert grooves in coupling and sealing relationship with said inserts; the improvement wherein:

said socket insert further comprises:

a first circumferentially continuous rib means extending along at least a portion of said socket shoulder radially inwardly of said socket groove, a second circumferentially continuous rib means extending into said socket defining means, with said socket groove being disposed intermediate said first and said second rib means;

said spigot insert further comprising:

a third circumferentially continuous rib means extending along at least a portion of said spigot end face, and a fourth circumferentially continuous rib means extending into said spigot groove being disposed intermediate said third and fourth rib means; and said gasket comprising:

a base section mounted in said spigot groove, and a generally bulbous head section, integral with said base section, being mounted in said socket groove;

said head section including a pair of shoulders engaging the outer surface of said spigot insert on opposite sides of said spigot groove.

* * * * *